United States Patent [19]
Abraham et al.

[11] 3,736,488
[45] May 29, 1973

[54] STEPPING MOTOR CONTROL SYSTEM UTILIZING PULSE BLANKING AND PULSE INJECTION TECHNIQUES INCLUDING PLURAL SHAFT ENCODER

[75] Inventors: Dennis G. Abraham, Vestal; Paul P. Grenchus; Ray A. McSparran, both of Endicott, all of N.Y.

[73] Assignee: International Business Machines Corporation, Armonk, N.Y.

[22] Filed: Aug. 13, 1971

[21] Appl. No.: 171,671

[52] U.S. Cl. .................. 318/696, 318/254, 318/585
[51] Int. Cl. ........................................... G05b 19/40
[58] Field of Search ................... 318/602, 603, 696, 318/685, 254

[56] References Cited
UNITED STATES PATENTS

| | | | |
|---|---|---|---|
| 3,586,953 | 6/1971 | Markkanen | 318/603 |
| 3,601,678 | 8/1971 | Abraham | 318/696 |
| 3,374,410 | 3/1968 | Cronquist et al. | 318/685 |
| 3,482,155 | 12/1969 | Fredriksen | 318/685 |
| 3,378,741 | 4/1968 | Sutton | 318/603 |
| 3,211,976 | 10/1965 | Brule et al. | 318/603 |
| 3,579,279 | 5/1971 | Inaba | 318/696 |
| 3,414,786 | 12/1968 | Kasmer et al. | 318/696 |

*Primary Examiner* — G. R. Simmons
*Attorney* — Paul M. Brannen, Wesley DeBruin and J. Jancin, Jr.

[57] ABSTRACT

Improved operation of a stepping motor normally operating in a closed loop mode is obtained by providing suitable logic circuit means connected to the motor and to the feedback paths which can cause the motor to shift to a higher slewing rate, when the logic circuitry blanks out a portion of a feedback pulse, thereby causing that pulse to appear like two pulses to the stepping motor input. The logic circuitry can also improve the stopping sequence of the stepping motor by switching the system from a normal closed loop running mode to an open loop mode during the final portion of the stopping sequence by provision of an artificial pulse inserted in place of the final feedback pulse which would normally be provided. The logic circuit scheme also can cause the motor to decelerate in an improved manner by blanking out a portion of the feedback pulse, thus retarding the motor operating field.

5 Claims, 9 Drawing Figures

INVENTORS
DENNIS G. ABRAHAM
PAUL P. GRENCHUS
RAY A. McSPARRAN
BY Paul M. Brannen
AGENT 3,736,488

STEPPING MOTOR CONTROL SYSTEM UTILIZING PULSE BLANKING AND PULSE INJECTION TECHNIQUES INCLUDING PLURAL SHAFT ENCODER

FIELD OF THE INVENTION

This invention relates generally to stepping motor control systems and in particular to an improved stepping motor control system normally utilizing feedback pulses for controlling operation of the motor, but also providing suitable logic circuits which provide pulse division and pulse blanking circuitry to provide improved operating characteristics of the stepping motor.

DESCRIPTION OF THE PRIOR ART

Previous stepping motor control systems have used alternating current logic schemes which do not lend themselves very well to implementations in modern circuit components, particularly for integrated circuits. The present arrangement has this advantage which provides higher reliability, more compactness and a lower cost. The present circuitry also provides a unique method for faster acceleration and provides a stopping sequence that operates in a closed loop mode until the motor is almost stopped. Under such circumstances the driving pulses are dependent on the motor shaft displacement instead of dependent upon time as provided by previous systems, which use circuitry employing single shots for stopping.

SUMMARY OF THE INVENTION

It is a principal object of the present invention to provide an improved stepping motor control system which has improved acceleration and deceleration characteristics.

A more particular object of the present invention is to provide a stepping motor control system in which an acceleration to a higher rate is provided by blanking out a portion of the feedback pulses in the system so that a single feedback pulse is caused to look like two feedback pulses.

Still another object of the invention is to provide a stepping motor control system in which the stopping sequence of the stepping motor includes switching from a closed loop mode of operation to an open loop mode during the final portion of the stopping sequence.

Still another object of the invention is to provide a stepping motor control system in which the deceleration sequence includes the insertion of an artificial pulse in the feedback loop rather than the final feedback pulse, which would normally be supplied.

Still a further object of the invention is to provide an improved arrangement of control logic for a stepping motor which is arranged to be more compatible with a direct current logic philosophy rather than an alternating current logic.

Other objects of the invention and features of novelty and advantages thereof will become apparent from the detailed description to follow, taken in connection with the accompanying drawings.

In practicing the invention, the drive circuits for the stepping motor are governed by circuitry which can be generally divided into three basic portions, namely, the feedback generator portion, the pulse division circuitry, including the so-called J-K latches, and the motor drive generation and selection portion.

The feedback portion is used primarily to alter the feedback waveform of the stepping motor control system, as provided by suitable feedback encoders driven by the motor shaft. In normal operation the entire circuitry operates on a closed loop basis during most of the operating time, but the feedback generator portion does switch to an open loop operation during the final portion of the motor stopping sequence. This arrangement is utilized since the last feedback pulse during the stopping sequence may be too low in amplitude to trigger the following circuitry and, accordingly, the last feedback pulse is blocked and an artificial pulse is inserted in its place. During an acceleration period, the feedback generator portion of the circuitry enhances the acceleration characteristics of the motor by a pulse division technique in which a portion of a particular feedback pulse is blanked out and therefore appears to the subsequent circuitry as two pulses. Such an operation will advance the field of the motor and make the motor shift to a higher slewing rate. Similarly, when the motor is to be slowed down to the normal slewing rate, the feedback generator portion of the circuitry causes the complete blanking of a feedback pulse, thus retarding the field and causing the rotor to coast down to a normal slewing rate.

GENERAL DESCRIPTION OF THE DRAWINGS

In the drawings.

In accordance with the customary practice, similar reference characters refer to similar parts in each of the several views.

DESCRIPTION OF THE PREFERRED EMBODIMENT

Figure 1:
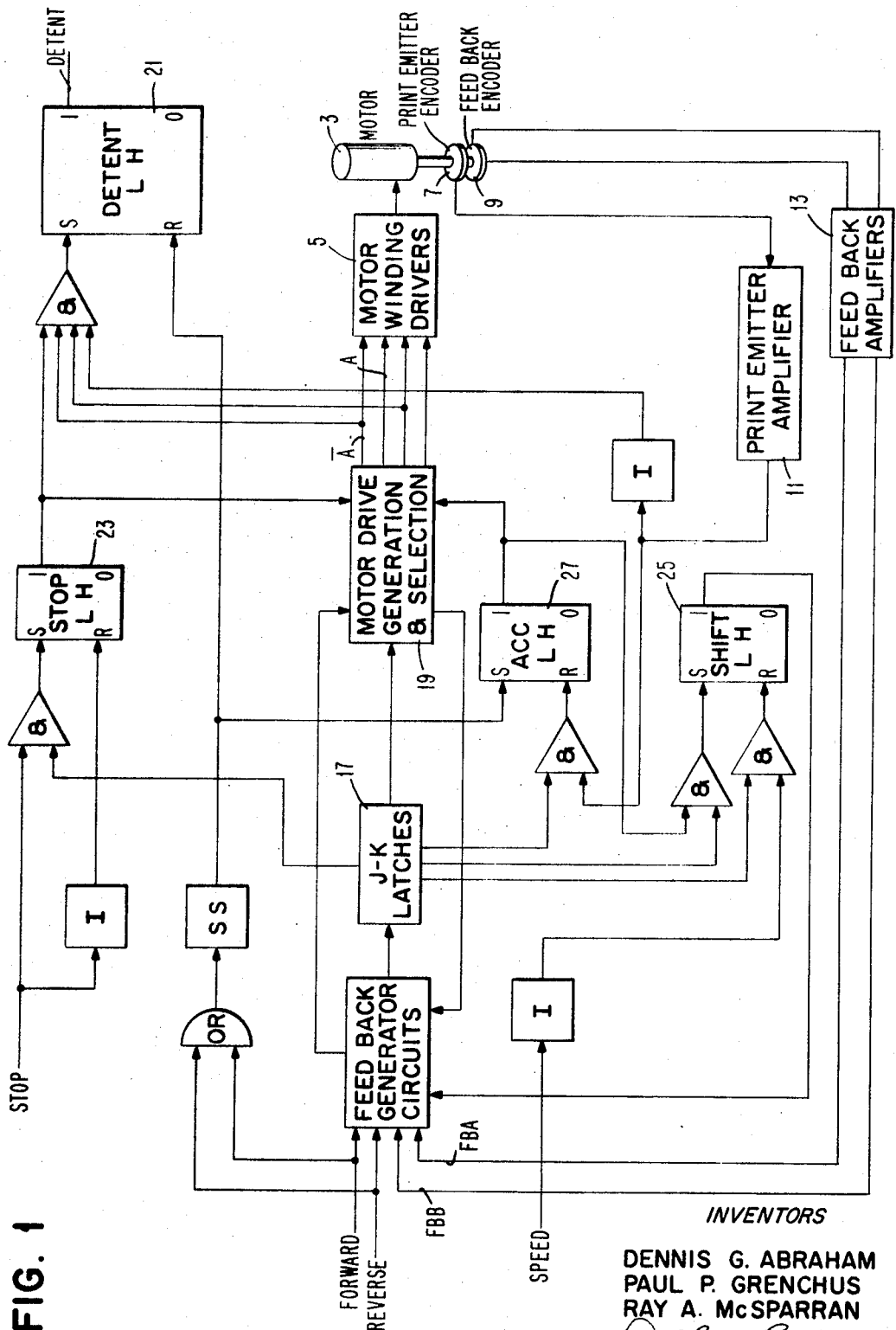
FIG. 1 is a diagrammatic illustration of a stepping motor control system including a preferred embodiment of the present invention.

Referring now to FIG. 1 of the drawings, the apparatus includes a conventional stepping motor 3, having its windings connected to a plurality of motor winding driving circuits indicated generally at 5, which circuits are arranged to supply pulses of energy of sufficient magnitude and proper phase relationship to the windings of the motor to cause its intended operation. A first and second feedback encoder 7 and 9 are provided on the motor output shaft, which also drives a suitable utilization device or load, not shown, since it may take any one of a number of forms and is not germane to the present invention. The outputs of the feedback encoder 7, also designated as print emitter encoder, and the feedback encoder 9 are supplied to suitable amplifying circuits 11 and 13, respectively, the outputs of which then constitute feedback pulses suitably encoded by the shaft encoders to be utilized in the closed loop operation of the system.

In the particular embodiment in which the present invention has found to be especially useful, the stepping motor is utilized to control a lead screw which positions a print head in a printing mechanism.

The apparatus shown in FIG. 1 further includes feedback generator circuits 15, the details of which will be subsequently explained, but which may be generally described as being involved with the utilization of feedback pulses from the feedback encoder for controlling the closed loop operation of the system.

A set of latches indicated generally at 17 and designated as J-K latches are indicated diagrammatically and are utilized for time division of the feedback pulses in connection with the operation of the system.

A further group of circuits known as motor drive generation and selection, are indicated generally at 19, and operate to supply the sequential pulses, which are supplied to the motor winding drive circuits 5 to operate the stepping motor 3. A detent latch 19, and a stop latch 21, are involved in the stopping and detenting of the motor under the control of appropriate signals supplied on a line designated as STOP. Forward and reverse control signals are supplied via control lines designated as Forward and Reverse, respectively. The speed control is governed by a line designated SPEED, and these inputs are combined with other signals from the J-K latches 17, to operate acceleration and shift control latches 25 and 27. The apparatus further includes various logic circuit elements, such as inverters, single shots and AND gates, as shown, the function of which will be more specifically described as the detailed portions of the circuit are taken up for consideration in the following description.

Figure 2:
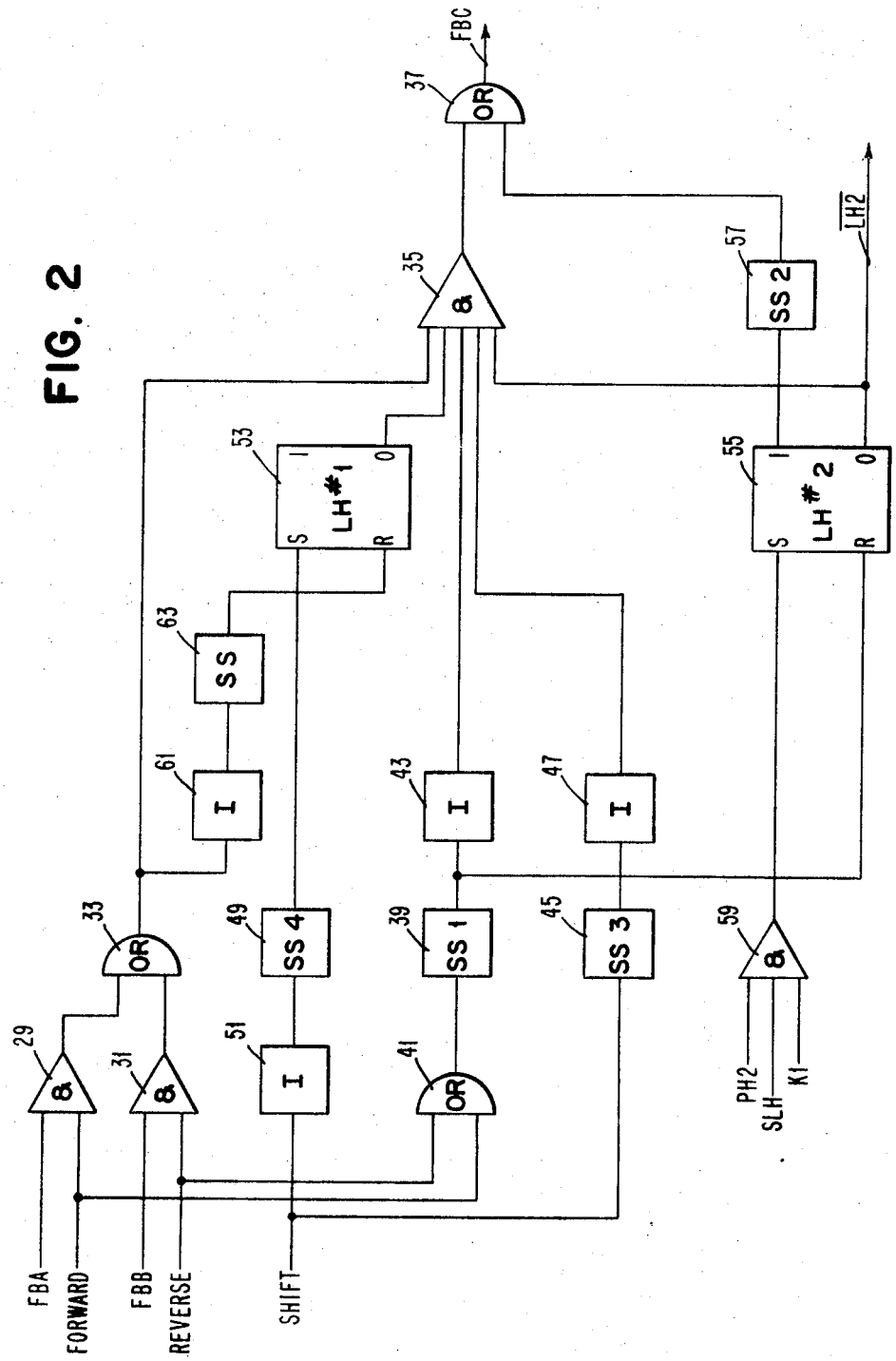
FIG. 2 is a diagrammatic showing of the feedback generator portion of the circuitry illustrated generally in FIG. 1.

The arrangement of logic circuits shown in FIG. 2 constitutes the details of the feedback generator circuits indicated generally by the rectangle 15 in FIG. 1. The purpose of these circuits is to gate in the proper feedback pulses from the motor shaft encoders and to appropriately modify the feedback pulses for shifting speed of the motor and for stopping. Normally, the feedback pulses from the forward or from the reverse signal lines of the shaft encoder are being supplied on the line FBA for forward motion or FBB for reverse motion. With the line Forward up for forward motion or the line Reverse up for reverse motion, it will be apparent that the feedback pulses will be passed by either AND circuit 29 or 31, respectively, the outputs of which are combined in an OR circuit 33, and fed to one input of AND circuit 35. The remaining inputs to the AND circuit 35 will be enabled at this time for reasons to be subsequently explained, and accordingly, the feedback pulses are supplied to one input of an OR circuit 37, from whence they are supplied on an output line FBC, to the J-K latch circuits to be subsequently described.

Considering the remainder of the components shown in FIG. 2, a single shot 39, also designated as SS1, is governed via an OR circuit 41 from the Forward and Reverse control lines, so that when these lines come up to start operation of the system in a forward or a reverse direction, single shot 39 will be fired, and as a result, with its output inverted by the inverter 43, AND circuit 35 will be disabled and feedback pulses will not be supplied to the line FBC. This is done in order to block any extraneous feedback pulses when the motor is starting to accelerate in either direction. Such pulses may be caused by rotor oscillations resulting from a previous stop.

If the shift latch is set ON, resulting in a signal on the line designated SHIFT, single shot 45 will be turned on and its inverted output 47 will disable AND circuit 35 so that a portion of the fourth feedback pulse in the sequence supplied to the motor will be blanked out and accordingly, the pulse will look like two pulses to the J-K latches, governed by the line FBC. This action will result in advancing the field of the motor and shifting the motor to a higher slewing rate. The effect is the same as if the lead angle of the shaft encoders or emitters were set farther ahead. When the shift latch is reset so that the signal is removed from the shift line, single shot 49, also designated as SS4, is fired by the output of an inverter 51 and thereby sets a latch 53, also designated as LH1. With this latch set on, the AND circuit 35 is disabled and the timing is such that one of the feedback pulses is blanked out, which normally would be supplied to line FBC, and accordingly, the J-K latches are affected in such a manner as to retard the field, thus causing the rotor to coast down to the normal slewing rate. The shift operation is used for every change even if the command is for low speed. The shift up and down is used for starting to get faster acceleration and is illustrated in the waveform diagrams to be described later. By employing an arrangement of this type, full velocity of the motor may be achieved in a minimum number of motor steps so that the stopping sequence is the same for a single character move of the print head as for a multiple character move.

In the actual use of stepping motors employing control systems of this general type, it is found that during a stopping sequence the required last feedback pulse will sometimes appear erratically. This can happen as a result of changes in friction in the mechanism driven by the motor, as well as the fact that the motor and its shaft is almost stopped when the last emitter pulse should occur, and the motion may not be properly detected by the encoding mechanism. Under such circumstances it is possible that the output from the encoder will be too low in amplitude to provide a useful feedback output signal. To eliminate this condition, a latch 55, designated as LH2 is provided, which when set on will disable the AND circuit 35 and will also energize a single shot 57, also designated as SS2, to provide a suitable output pulse on the line FBC via OR circuit 37. The latch LH2 is set on by the output of an AND circuit 59, the inputs of which are designated PH2, SLH and K1, which are signals derived from other portions of the circuitry to be later described, but which indicate that a stopping sequence is in effect. The single shot 57 may be made variable in its duration and can be adjusted in each instance to provide a proper stop for the mechanism driven by the stepping motor, to keep the motor oscillations to a minimum.

The resetting circuit for the latch 53 comprises an inverter 61 and a single shot 63, so connected that the latch 53 will be reset during the absence of feedback pulses, and thus is in condition to be set on when a starting sequence is involved. The reset circuit for latch 55 is provided by the output of single shot 39, so that latch 55 is reset when a starting sequence is initiated.

Figure 3:
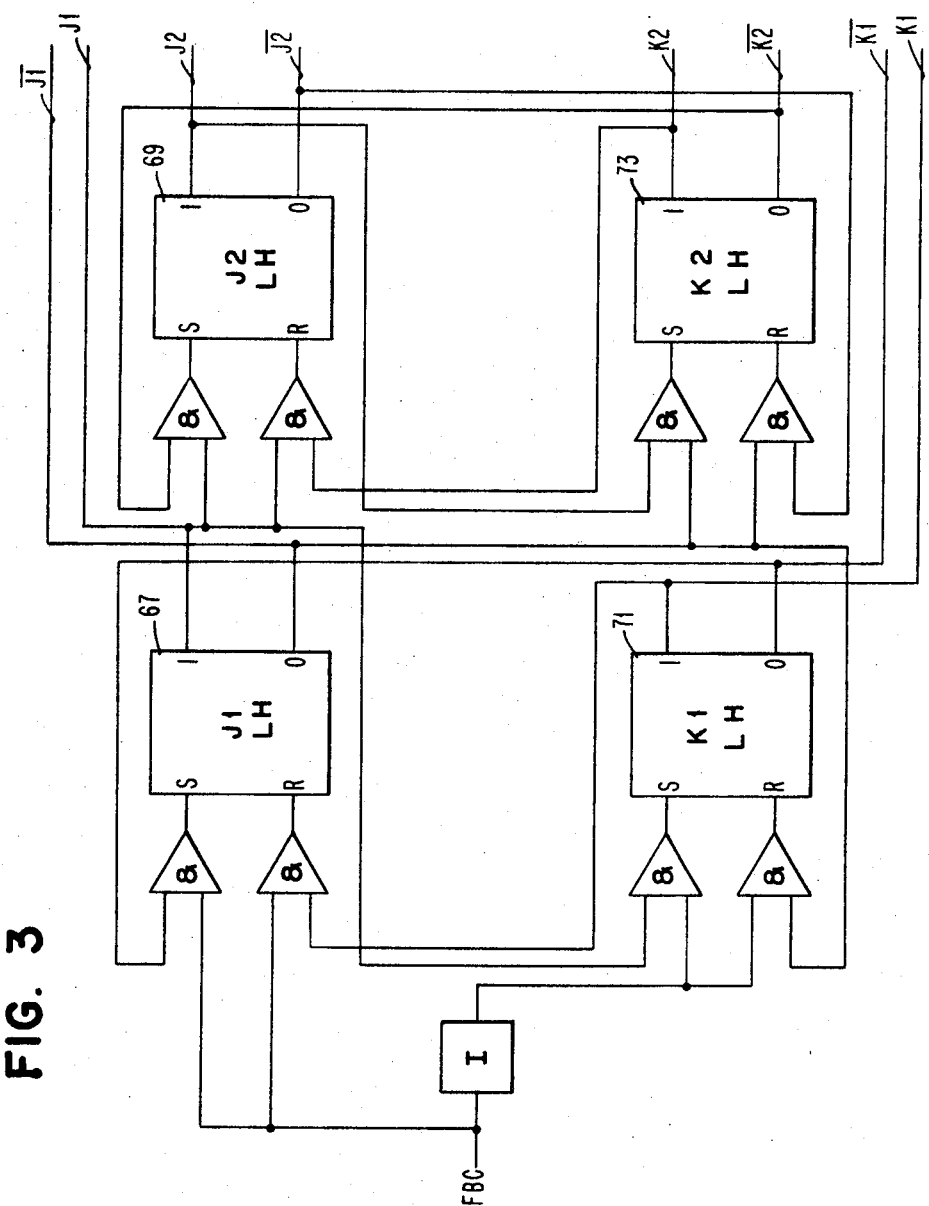
FIG. 3 is a detailed diagram of the arrangement of the J-K latches shown generally in FIG. 1.

FIG. 3 illustrates the connections of the inputs and outputs of the four latches which make up the J-K combination, utilized to derive the timed sequences for driving the stepping motor. The latches 67, 69, 71, and 73 are also designated as J1LH, J2LH, K1LH, and K2LH, respectively. Each of these latches is of a normal configuration and includes in its input circuits a pair of AND circuits as shown, which supply signals from an appropriate input to the latch as well as to provide an additional input from the corresponding latch in the pair. The operation of the J-K latches is well-known in the art, and since the circuit arrangement is symmetric and readily apparent from the drawing, it is considered that a detailed explanation of the manner in which these latches sequentially operate upon the supply thereto of control pulses on the line FBC is unnecessary. Suffice it to say that output pulses are supplied in appropriate sequences on the output lines designated as $\overline{J1}$, J1, $\overline{J2}$, J2, $\overline{K2}$, K2 and $\overline{K1}$ and K1, as shown in the drawings. Various of these output signal lines are utilized in governing the operation of the shifting, stopping and accelerating latches to be later described, as well as in the actual motor drive generation and selection pulses also to be subsequently described.

Figure 4:
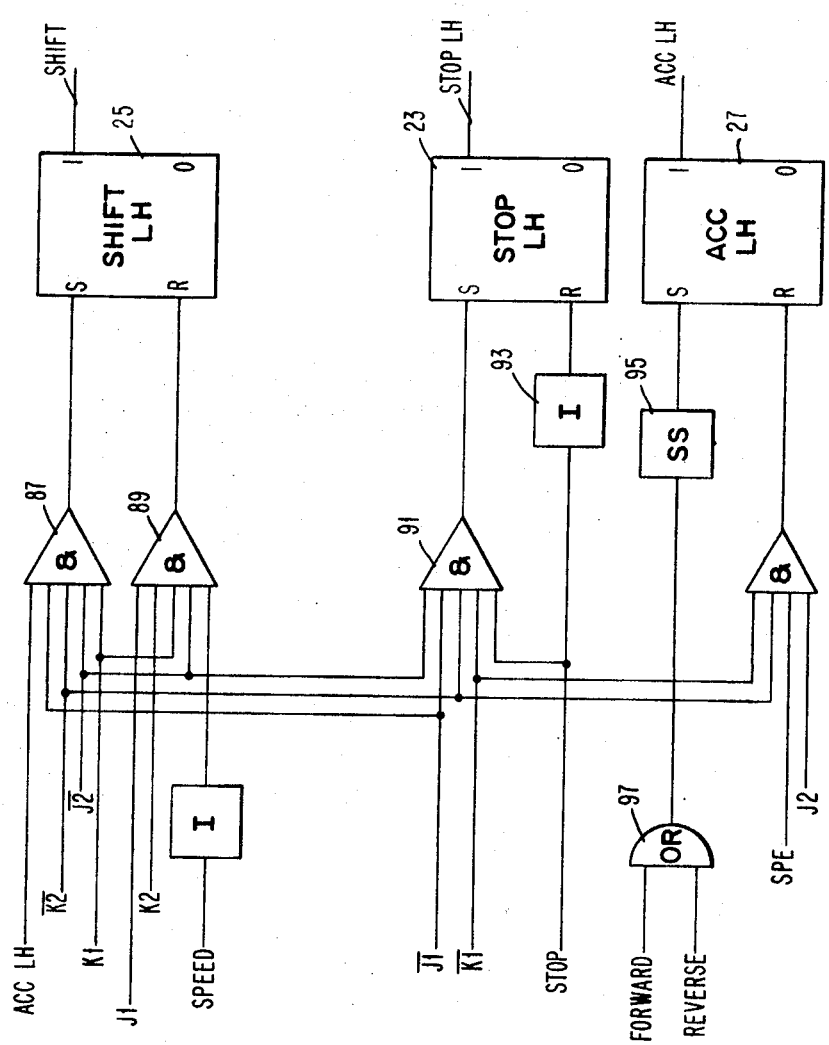
FIG. 4 is a diagrammatic illustration of the logic and controls for the shift, stop and accelerate latches shown in FIG. 1.

FIG. 4 illustrates the actual logic connections used for the setting and the resetting of the three control latches known as SHIFT LH, STOP LH and ACC LH, also bearing reference characters 25, 23, and 27, respectively.

The SHIFT LH latch 25 is set to its ON condition as the result of the output from an AND gate 87, which combines the signal ACC LH, the output of the accelerate latch ACC LH, reference character 27, with signals that require that the J-K latches be in the condition where the K1 latch is set, but K2, J1 and J2 are reset. Latch 25 is reset to its off state by the output of an AND circuit 89, which supplies an output under the conditions that the speed signal is not present, and that the J-K latches are in the condition where K1 and K2 output signals are present, as well as J1 and $\overline{J2}$.

The stop latch, STOP LH, reference character 23, is set to its ON condition to provide an output on the STOP LH line, as the result of a signal supplied from the output of an AND circuit 91, which is rendered effective when a signal is present on the STOP line, and when the J-K latches are in the condition in which all four of the latches are off. In other words, so that signals are present on the lines $\overline{K1}$, $\overline{K2}$, $\overline{J1}$, and $\overline{J2}$. The latch 23 is reset when the STOP signal is removed from the STOP line by inversion of the signal with an inverter 93.

The latch 27, designated ACC LH, provides an output signal on its line ACC LH, as a result of the supply to the set terminal of the latch from a single shot 95, the input of which is connected to an OR circuit 97, which is energized when either the Forward or the Reverse line has a signal thereon. Accordingly, when a signal is received to operate the system in forward or reverse, a momentary pulse will be sent to the latch 27 to turn it on. This latch is reset by the presence of a signal on the line SPE, as well as the condition where the J-K latches are such that K1 and K2 are off, and J2 is on.

Figure 5:
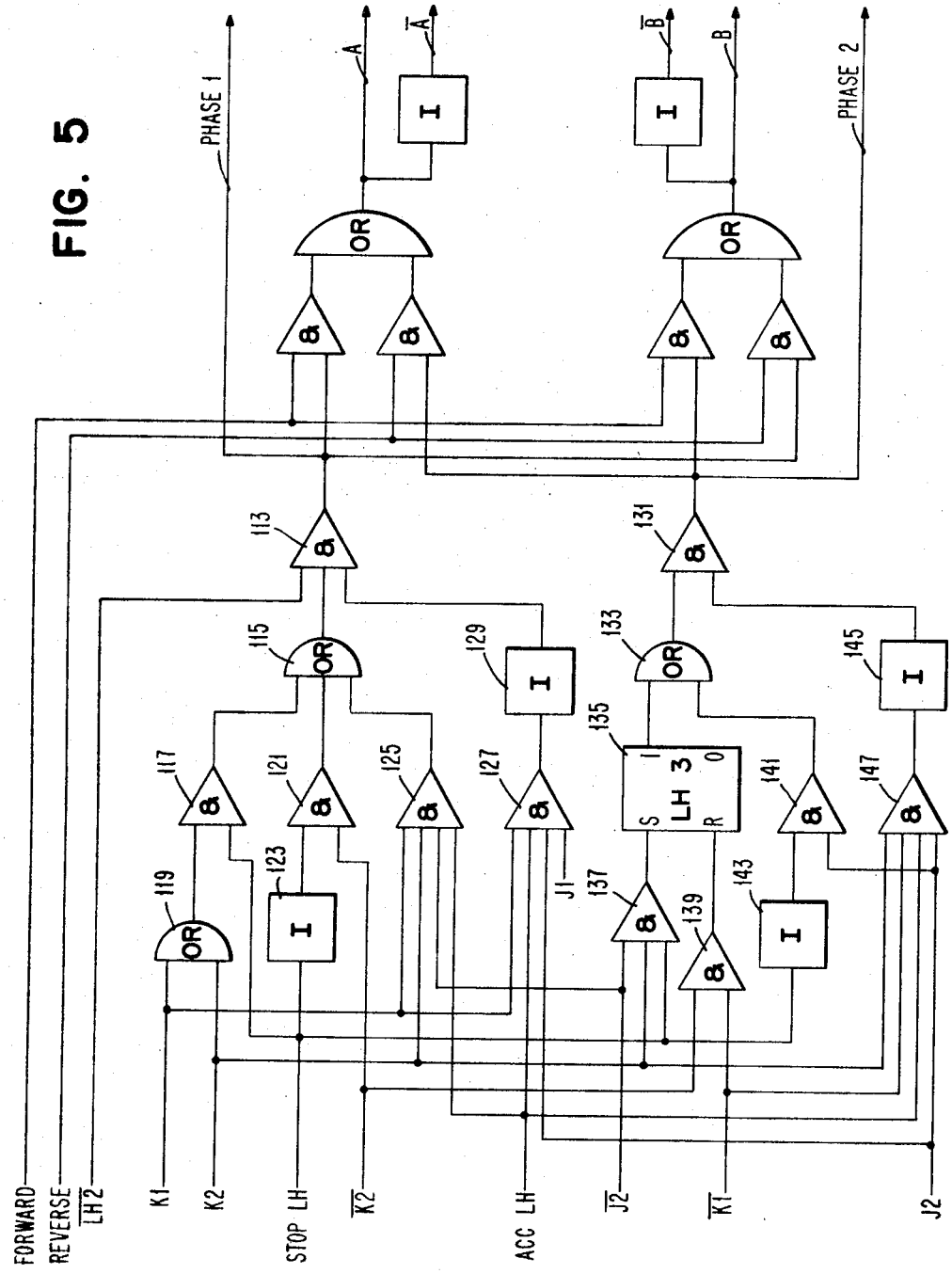
FIG. 5 is a diagrammatic illustration of the detailed motor drive generation and selection circuitry shown generally in FIG. 1.

FIG. 5 of the drawings shows the motor drive pulse generation and selection circuitry, which provide the necessary sequence of pulses to the windings of the stepping motor to operate it in the proper direction and with appropriate acceleration and deceleration functions. Generally speaking, the timing pulses from the J-K latches are suitably gated by the logic circuits shown to create Phase 1 and Phase 2 drive pulses. Phase 1 is driving Phase A in the forward direction and driving Phase B for reverse operation. In the normal running mode Phase 1 will be the same as K2 and Phase 2 will be the same as J2. During the starting sequence the waveforms are modified by the acceleration latch being set which causes the phase angle to be advanced, as will be more clearly seen from the waveform illustrations. This provides more torque from the motor and also better acceleration. When the accelerate latch is reset, the shift latch will have been set and continues the phase advance for maximum acceleration. If there is no signal on the speed line which indicates low speed, the shift latch will be reset on the trailing edge of the sixth feedback pulse and the motor will continue at this speed until a STOP signal is received. The STOP signal is synchronized with the fourth pulse from the print emitter and the stop latch then comes on to give a four step stopping sequence. After the motor has stopped, the detent latch comes on and gives a signal back to the controlling system. After the detent latch comes on, a short delay is required in order to allow the motor to settle before issuing the next move command. The Phase 1 and Phase 2 signal lines shown in FIG. 5 are alternatively gated through a plurality of AND and OR circuits, as seen at the right side of the figure to provide outputs on the A and B lines and inverted outputs on the $\overline{A}$ and $\overline{B}$ lines in accordance with the selection by the signals on the Forward and the Reverse directional control lines.

The Phase 1 and Phase 2 signals are generated by combining the signals from the J-K latch outputs along with other control signals in appropriate logic circuitry. For example, Phase 1 signals are provided at the output of an AND gate 113, one input of which is the signal line $\overline{LH2}$, indicating that latch 2 has not been set. A second input to AND gate 113 is the output of OR circuit 115, one input of which is supplied from an AND circuit 117, which in turn has applied thereto a signal from the line STOP LH, and the output of an OR circuit 119, to which the outputs of K1 and K2 are supplied. A second input to the OR circuit 115 is the output of an AND circuit 121, which is the inverted input of the line STOP LH, inverted by an inverter 123. Still a third input to the OR circuit 115 is the output of an AND circuit 125, the inputs of which are K1, K2, $\overline{J2}$, and the signal line ACC LH.

The inverted output of an AND circuit 127 is supplied via the inverter 129 as the third input to the AND circuit 113. AND circuit 127 has four inputs, comprising the signals K1, J1, J2 and ACC LH.

The logic controlling the Phase 2 signal line includes an AND circuit 131, having one input thereto from the output of an OR circuit 133. OR circuit 133 is connected to the output of a latch LH3, reference character 135, which is set on by the output of an AND circuit 137, the inputs of which are $\overline{J2}$, K2 and STOP LH. Latch 135 is reset and its output is turned off as a result of a signal supplied from an AND circuit 139, whose inputs constitute the signals $\overline{K2}$ and $\overline{K1}$.

The other input to OR circuit 133 is the output of an AND circuit 141, having its inputs connected to the lines J2 and to the line STOP LH through an inverter 143.

The other input to AND circuit 131 is from an inverter 145 which is supplied from the output of an AND circuit 147 having four inputs, namely, ACC LH, K2, J2 and $\overline{K1}$. The combinations of the signals from the J-K latches when combined with the proper control signals such as ACC LH and STOP LH, cause signals of the proper time relationship and sequence to be supplied to the forward and reverse selective AND circuits, which in turn supply them to the A and B lines and the inverted signal lines $\overline{A}$ and $\overline{B}$.

FIGS. 6, 7, 8 and 9 illustrate the waveforms encountered in various points in the system during its operation in different modes.

Figure 6:
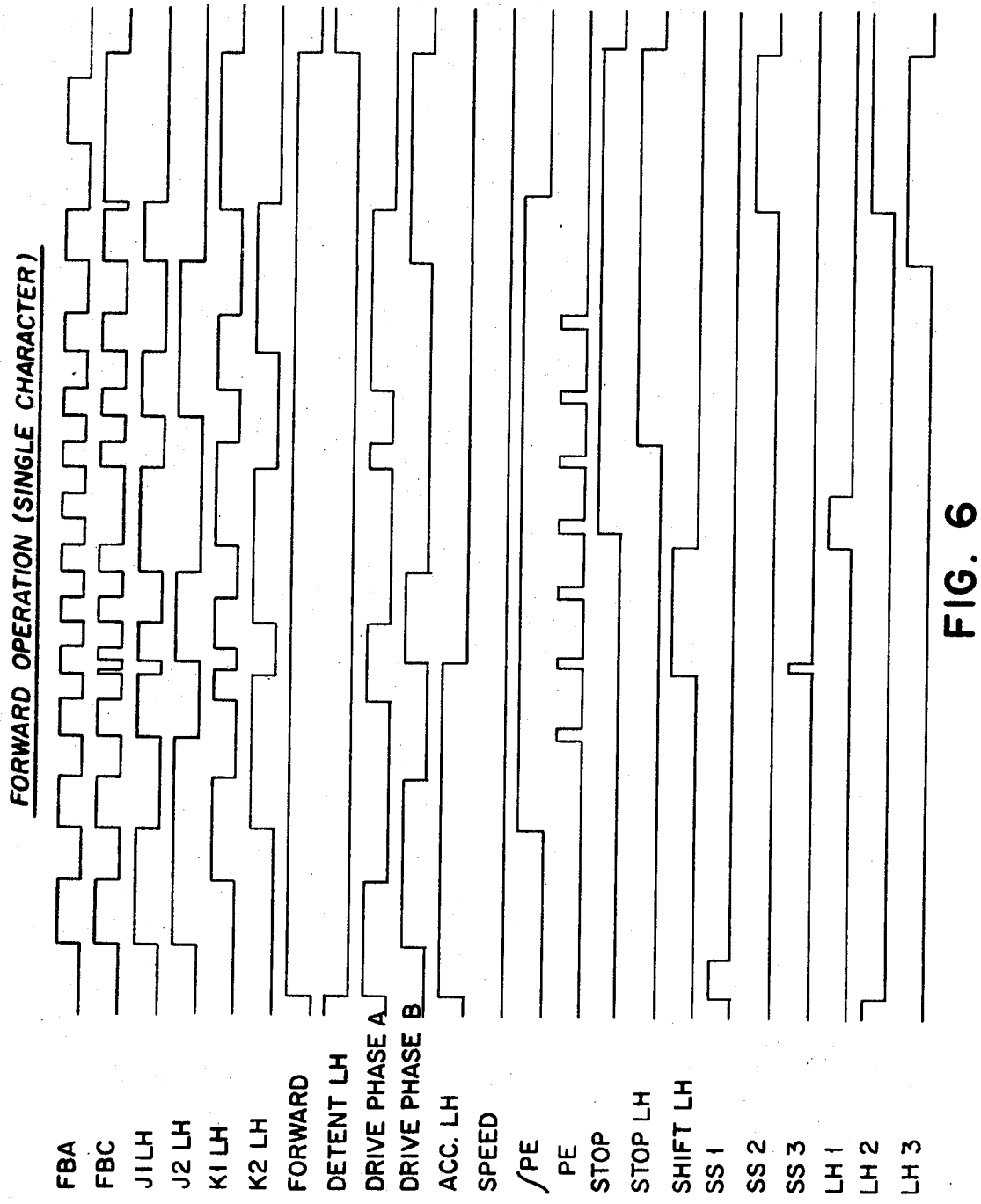
FIG. 6 is a diagrammatic illustration of waveforms encountered in particular portions of the system, during forward operation of the stepping motor for single character operation.
Figure 7:
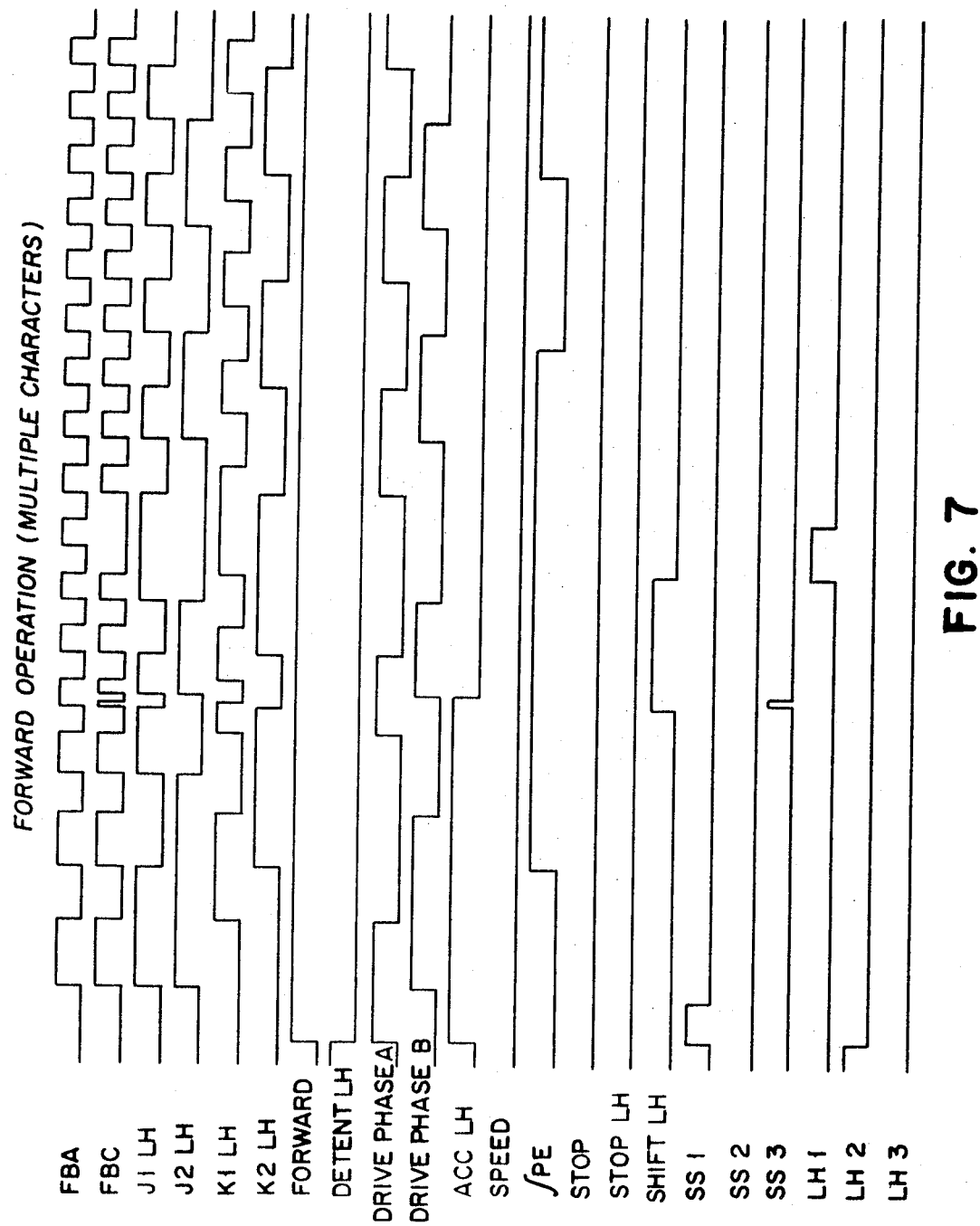
FIG. 7 is a diagrammatic illustration of waveforms encountered in the system during a forward operation of the motor for multiple character operation.

FIGS. 6 and 7 illustrate the waveforms in the system during forward operation of the motor, FIG. 6 being illustrative of operation for generation of a single character which requires only a very small advance of the lead screw driven by the motor, and FIG. 7 showing the operation where the lead screw must be maintained in continuous motion for a longer period, in order to generate multiple characters.

Figure 8:
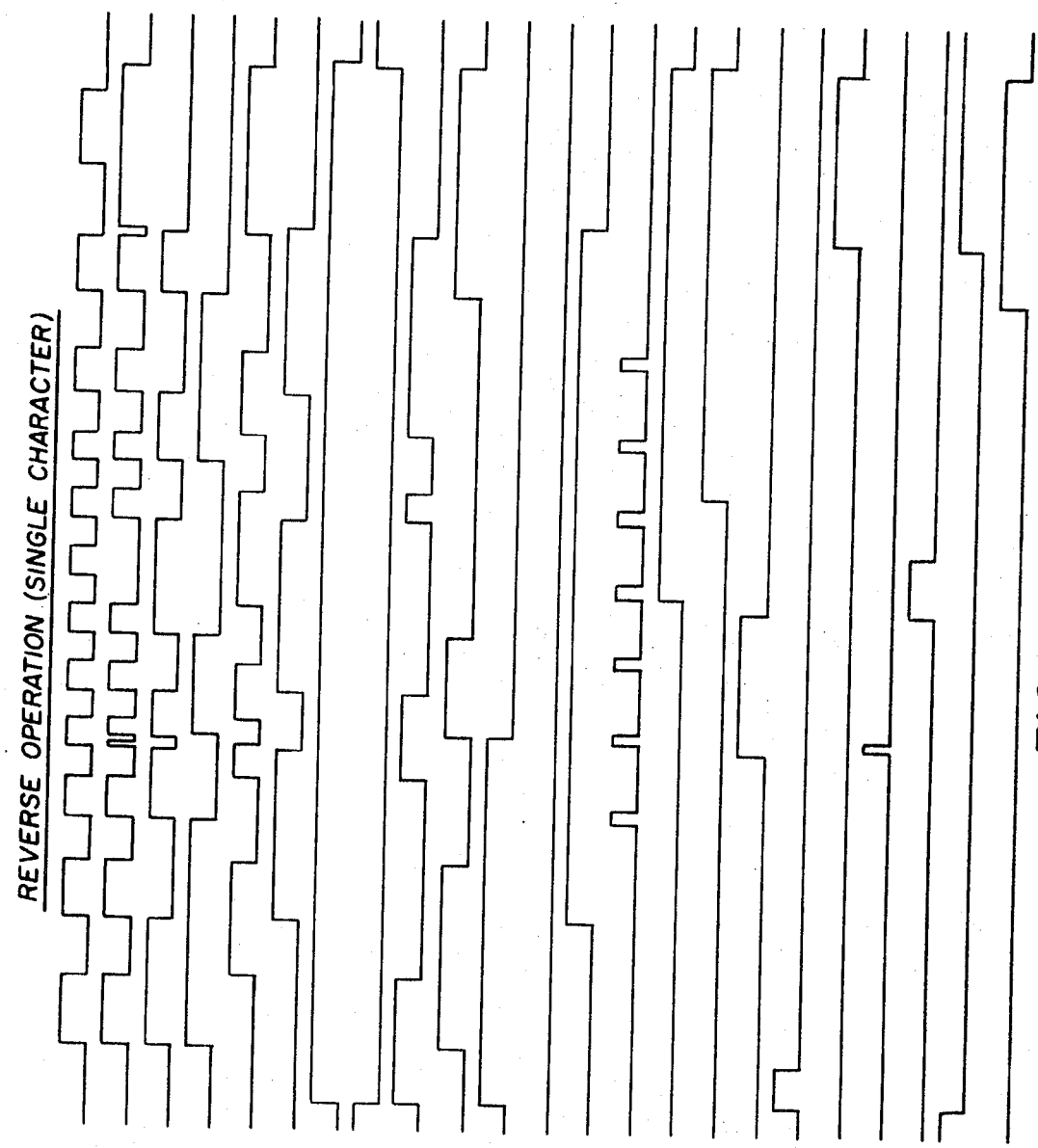
FIG. 8 is a diagrammatic illustration of the reverse operation of the motor for single character operation.
Figure 9:
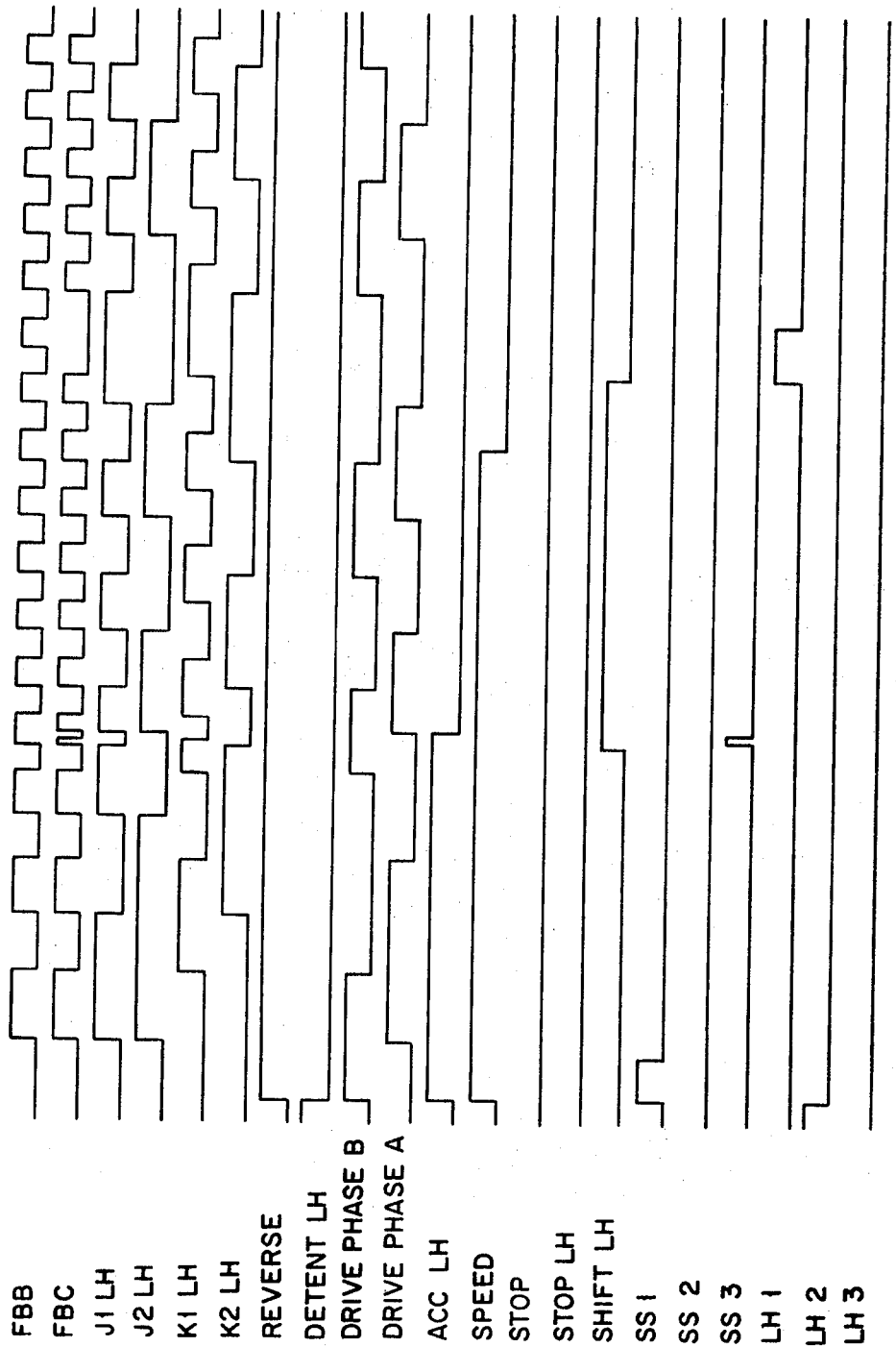
FIG. 9 is a diagrammatic illustration of the waveforms encountered during reverse operation of the motor for multiple characters.

FIG. 8 is illustrative of the waveforms for reverse operation of the motor, when a single character is to be printed, whereas FIG. 9 illustrates reverse operation when the plurality of characters is to be formed.

It will be apparent from examination of these waveforms, how the forward and reverse feedback pulses from the feedback encoder 9 are gated by the circuitry to provide appropriate feedback control pulses, which govern the generation of the driving pulses for the motor.

Considering the operation illustrated in FIG. 6, for example, the forward operation is determined by the Forward line coming up which drops output of the detent latch, DETENT LH. This starts the generation of the drive Phase A pulses and the drive Phase B pulses. As a result of this operation, plus the ACC LH latch coming up, and SS1 firing, the motor is started by this supply of pulses on the FBC line, and a concomitant output is provided from the encoder line FBA.

The J1, J2, K1, and K2 latches are then sequentially energized to form the pulse train shown, which in turn generates the driving pulses, as is usual in a system operating in a closed loop mode.

As can be seen from the drawing, when the shift latch output line SHIFT LH rises, the signal is combined with a short output pulse on line SS3, which causes the FBC pulses at that time to be effectively divided into two portions. This in turn advances the operation of the driving circuits so that the resultant effect is the same as if two feedback pulses had been supplied at this time, instead of one, thereby advancing the motor field. Thereafter, when the stop signal line rises, and the stop latch output STOP LH is up, these signals are combined with an output from the latch $\overline{LH1}$, to eliminate one of the pulses on the line FBA from preventing an output on the line FBC. Accordingly, a stopping sequence is initiated since the motor field will now be retarded with respect to the position of the rotor. The system is finally restored to its stationary position, in which the various signal output lines have the values as schematically shown at the right-hand side of FIG. 6, particularly with the forward drive line down and the detent latch line up, the stop line and stop latch line down, line LH2 up, line SS2 down, and LH3 down.

FIG. 7 is an illustrative diagram showing the waveforms encountered in the system when the system is driving the lead screw forward through a number of positions for a multiplicity of character printing operations. It will be noted that the initial portion of the operation is the same as that previously described in connection with FIG. 6, except that in the present instance, since the motor is to continue running in order to print multiple characters, no stop signal is delivered to the system. It is apparent from the drawings that after the system comes up to speed, the operation of the feedback encoder signals, the outputs of the J-K latches, and the drive Phases A and B have the symmetry which would be expected.

FIGS. 8 and 9 are similar to FIGS. 6 and 7, except that a reverse direction is assumed for the system. Under these circumstances, the system will select the pulses FBB from which to generate the feedback control pulses, but otherwise the operation of the system is essentially similar to that described above in connection with FIGS. 6 and 7, and hence, these figures will not be described in any greater detail.

From the foregoing it will be apparent that the present invention provides an improved stepping motor control system particularly suited for operating the lead screw of a printing mechanism at different rates in both forward and reverse directions, with a minimum amount of control logic and especially suited for conventional direct current logic elements.

While the invention has been particularly shown and described with reference to a preferred embodiment thereof, it will be understood by those skilled in the art that various changes in form and details may be made therein without departing from the spirit and scope of the invention.

What is claimed is:

1. A stepping motor control system, comprising, in combination, a stepping motor having a plurality of windings to which driving pulses are applied in a first sequence to cause said motor to operate in a forward direction and as applied in a second sequence to cause said motor to operate in the reverse direction, control signal means effective to provide signals for starting, stopping speed changes, and directional inputs to said system a first and a second shaft feedback encoder means operated by said motor to provide shaft feedback pulses concurrent with the rotation of said motor, said first encoder means being associated with forward motion of the motor and said second encoder means being associated with reverse rotation of said motor, each of said encoder means providing serial feedback pulses on an associated signal line feedback pulse generator circuit means connected to said control signal means and said first and second shaft feedback encoder means signal lines for supplying serial feedback pulses to a feedback control line a pulse sequence generator connected to said feedback control line for providing a plurality of pulses in a predetermined sequence as serial pulses are supplied thereto on said feedback control line and motor drive generation and selection signal means connected to said pulse sequence generator means, said control signal means and said stepping motor for supplying driving pulses to said stepping motor in said first and said second sequences.

2. A stepping motor control system as claimed in claim 1, in which said pulse sequence generator comprises two pairs of latches, interconnected and governed by said feedback control line.

3. A stepping motor control system as claimed in claim 1, which acceleration control is provided by said feedback generator means deleting a portion of one of said feedback pulses to thereby cause the equivalent of two pulses instead of one appearing on said feedback control line.

4. A stepping motor control system as claimed in claim 1, in which a stop signal line is connected to said motor drive generator and selection signal means for supplying a final stopping drive pulse to said motor during deceleration.

5. A stepping motor control system as claimed in claim 1, further including a plurality of condition control latches connected to said control signal means for generating signals additionally governing said feedback generator means and said motor drive generator and selection means.

* * * * *